(12) United States Patent
Guo et al.

(10) Patent No.: US 10,623,744 B2
(45) Date of Patent: Apr. 14, 2020

(54) SCENE BASED RATE CONTROL FOR VIDEO COMPRESSION AND VIDEO STREAMING

(71) Applicant: Apple Inc., Cupertino, CA (US)

(72) Inventors: Mei Guo, San Jose, CA (US); Jun Xin, Sunnyvale, CA (US); Yeping Su, Sunnyvale, CA (US); Chris Y. Chung, Sunnyvale, CA (US); Xiaosong Zhou, Campbell, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 40 days.

(21) Appl. No.: 15/724,798

(22) Filed: Oct. 4, 2017

(65) Prior Publication Data

US 2019/0104315 A1 Apr. 4, 2019

(51) Int. Cl.
| | | |
|---|---|---|
| *H04N 19/142* | (2014.01) | |
| *H04N 19/172* | (2014.01) | |
| *H04N 19/66* | (2014.01) | |
| *H04N 19/44* | (2014.01) | |
| *H04N 19/115* | (2014.01) | |
| *H04N 19/14* | (2014.01) | |
| *H04N 19/179* | (2014.01) | |
| *H04N 19/136* | (2014.01) | |
| *H04N 19/124* | (2014.01) | |
| *H04N 19/146* | (2014.01) | |
| *H04N 19/17* | (2014.01) | |
| *H04N 19/117* | (2014.01) | |
| *H04N 19/192* | (2014.01) | |

(Continued)

(52) U.S. Cl.
CPC ......... *H04N 19/142* (2014.11); *H04N 19/115* (2014.11); *H04N 19/117* (2014.11); *H04N 19/124* (2014.11); *H04N 19/136* (2014.11); *H04N 19/14* (2014.11); *H04N 19/146* (2014.11); *H04N 19/17* (2014.11); *H04N 19/172* (2014.11); *H04N 19/179* (2014.11); *H04N 19/192* (2014.11); *H04N 19/44* (2014.11); *H04N 19/46* (2014.11); *H04N 19/66* (2014.11); *H04N 19/86* (2014.11)

(58) Field of Classification Search
CPC .... H04N 19/46; H04N 19/115; H04N 19/146; H04N 19/137; H04N 19/142; H04N 19/61

See application file for complete search history.

(56) References Cited

U.S. PATENT DOCUMENTS

8,243,790 B2 * 8/2012 Leontaris ............. H04N 19/105
375/240.02
2007/0153692 A1 7/2007 Song et al.
(Continued)

*Primary Examiner* — Neil R Mikeska
(74) *Attorney, Agent, or Firm* — BakerHostetler (57) ABSTRACT

The present disclosure describes techniques for coding video data in a manner that provides consistency to portions of the video that have similar content. According to such techniques, a video sequence may be parsed into partitions and content of the partitions may be analyzed. Partitions may be grouped together based on detected similarities in content. Coding parameters may be selected for each partition based on the partition's membership in the groups. Thus, when the video sequence is coded, coding parameters for frames of two commonly-grouped partitions may be similar, which causes coded video data to have similar presentation.

35 Claims, 6 Drawing Sheets

(51) Int. Cl.
*H04N 19/46* (2014.01)
*H04N 19/86* (2014.01)

(56) References Cited

U.S. PATENT DOCUMENTS

| | | | |
|---|---|---|---|
| 2012/0002725 A1* | 1/2012 | Kazui | H04N 19/105 375/240.12 |
| 2012/0195369 A1 | 8/2012 | Guerrero | |
| 2013/0044224 A1* | 2/2013 | Liao | H04N 17/004 348/192 |
| 2013/0166580 A1* | 6/2013 | Maharajh | H04L 65/605 707/758 |
| 2013/0272383 A1 | 10/2013 | Xu et al. | |
| 2014/0092313 A1* | 4/2014 | Harada | H04N 5/783 348/714 |
| 2014/0328414 A1* | 11/2014 | Puri | H04N 19/176 375/240.29 |
| 2015/0334395 A1 | 11/2015 | Schwartz et al. | |
| 2018/0005041 A1* | 1/2018 | Narayan | G06K 9/00765 |
| 2018/0098083 A1* | 4/2018 | McAllister | H04N 19/172 |
| 2018/0176577 A1* | 6/2018 | Puri | H04N 19/61 |

* cited by examiner

SCENE BASED RATE CONTROL FOR VIDEO COMPRESSION AND VIDEO STREAMING

BACKGROUND

The present disclosure relates to video coding.

Video coding finds use in many modern consumer electronic applications. Media players, such as media rendering applications, set top boxes and DVD players, commonly receive video data that has been coded by bandwidth compression techniques. The media players decode the video data before rendering it on a display. In other applications, videoconferencing applications perform bidirectional exchanges of coded video data. Each device codes video data representing locally-acquired video and transmits the coded video to another device. The other device receives and decodes the coded video, then renders it on a display.

Video coding and decoding processes typically are "lossy" processes. Video data recovered by decoders provides a representation of the source video from which it is derived but it possess various errors. When such errors are perceptible by human viewer, they often cause dissatisfaction with the viewing experience.

In many media exchange applications, different portions of a video may have very similar content. Consider, for example, a produced video where two characters are engaged in spoken dialogue with each other. Oftentimes, such events are represented by a video sequence that contains image information of a first speaker, then a second. Image content of the video sequence may toggle between image information of the two speakers for a time as the event progresses.

In many applications, video coders may apply different coding techniques at various points during such an event, which leads to different sets of artifacts. In the example above, a video coder may code image information of the first speaker differently during a first portion of spoken dialogue than during a second portion of dialogue, and the video coder may code representation of the first speaker differently during third, fourth, etc. portions as well. These different codings each may induce different sets of artifacts when the coded video data is decoded and rendered, which may lead to a dissatisfactory viewing experience.

DETAILED DESCRIPTION

Embodiments of the present disclosure provide techniques for coding video data in a manner that provides consistency to portions of the video that have similar content. According to such techniques, a video sequence may be parsed into partitions and content of the partitions may be analyzed. Partitions may be grouped together based on detected similarities in content. Coding parameters may be selected for each partition based on the partition's membership in the groups. Thus, when the video sequence is coded, coding parameters for frames of two commonly-grouped partitions may be similar, which causes coded video data have similar presentation.

Figure 1:
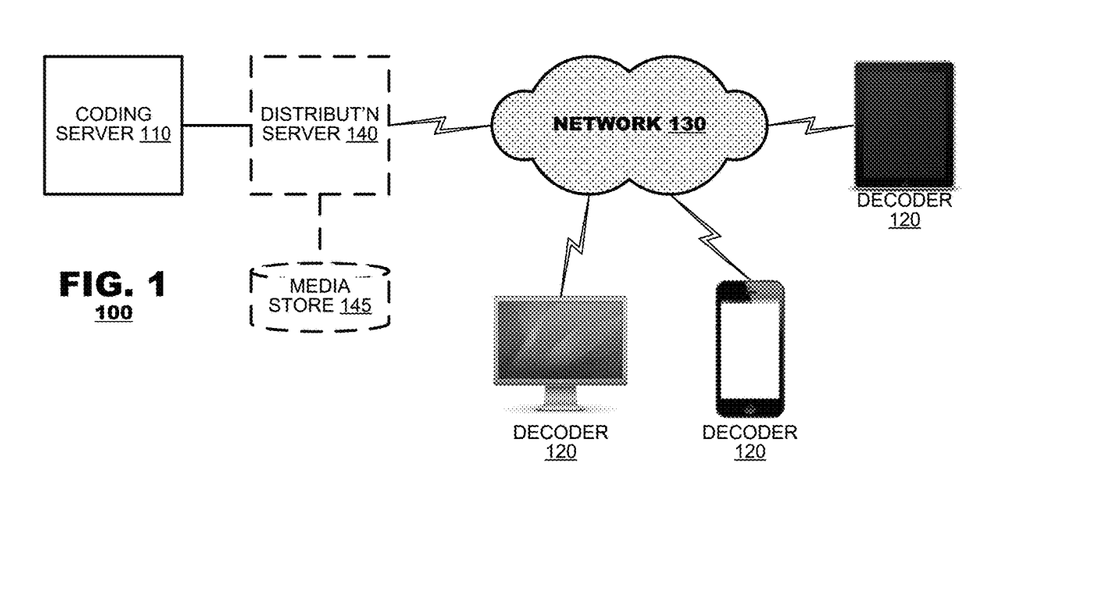
FIG. 1 illustrates a system according to an aspect of the present disclosure.

FIG. 1 illustrates a system 100 according to an aspect of the present disclosure. The system 100 may include a coder 110 and one or more decoder devices 120 ("decoders") provided in communication via a communication network 130. The coder 110 may code video data by bandwidth compression techniques, which video is distributed to decoder(s) 120 via the network 130.

Typically, the video is presented to the coder 110 as a sequence of frames (not shown) having a predetermined frame rate and resolution. The coder 110 may apply bandwidth compression operations to the video to exploit spatial and/or temporal redundancies in the video to generate a coded video sequence that occupies less bandwidth than the source video sequence. The coder 110 may apply compression operations that are defined by one or more interoperability standards, such as the ITU-T H.265, H.264, H.263 or related coding protocols. The coded video data may be represented by a syntax defined by the coding protocol, that indicates coding operations applied by the coder 110.

Decoders 120 may decode the coded video to generate recovered video therefrom. Typically, the recovered video is a replica of the source video that was coded by the coder 110 but it possess coding errors (commonly, "artifacts") due to data loss incurred by the coding process. Recovered video generated by a decoder 120 may be output to a display, stored at the decoder 120 for later use or consumed by other applications (not shown) executing on the decoder device 120.

Typically, a coder 110 codes a source video sequence on a frame-by-frame basis. Coding often occurs by motion-compensated prediction in which content from an input frame is coded differentially with respect to previously-coded data already processed by the coder 110. For example, content of an input frame may be coded by intra-prediction (commonly "I coding"), which causes the content to be coded with reference to other, previously-coded content from the same input frame. Alternatively, the content may be coded by an inter-prediction mode, called "P coding," which causes the content to be coded with reference to content from a single previously-coded frame. As yet another option, the content may be coded by another inter-prediction mode, called "B coding," which causes the content to be coded with reference to a pair of previously-coded frames. And still other coding modes are available, such as "SKIP" mode coding, which causes content of an input frame not to be coded at all but instead to re-use recovered content of a previous frame.

Once a coder 110 selects a coding mode for an input frame, the coder 110 also may select a variety of other coding parameters such as quantization parameters, choice of in loop filtering, type of transform and the like. The coder 110 also may select other coding parameters independently of the coding mode applied to each frame, such as frame decimation and/or frame resolution adaptation. All of these selections of coding parameters provide their own contribution to an amount bandwidth compression achieved by the coding/decoding process and also incur their own cost in terms of the artifacts that are created.

In the example of FIG. 1, coding operations are illustrated as being performed at a coder 110. Coding operations may be performed at server devices but, in other aspects of the disclosure, coding operations may be performed by other computing equipment, such as smart phones, tablet computers, laptop computers, personal computers, and media devices. Coding operations may be performed either for real time delivery of video or store and forward delivery. In this latter case, a coder 110 may output coded video data to a distribution server 140 where it is stored in media store 145 for delivery to decoders 120. Typically, in the store-and-forward distribution model, the coded video data is downloaded to a decoder 120 in response to decoder-initiated requests, made by HTTP or similar protocol.

Similarly, decoders 120 are illustrated in FIG. 1 as smart phones, tablet computers and/or display devices. Decoding operations may be performed by other computing equipment, such as laptop computers, personal computers, media players, display devices and/or dedicated videoconferencing equipment.

The network 130 represents any number of communication and/or computer networks that provide communication between a coder 110 and a decoder 120, including circuit switched networks and/or packet switched networks such as the Internet. The architecture and operation of the network 130 is immaterial to the present discussion unless described hereinbelow.

Figure 2:
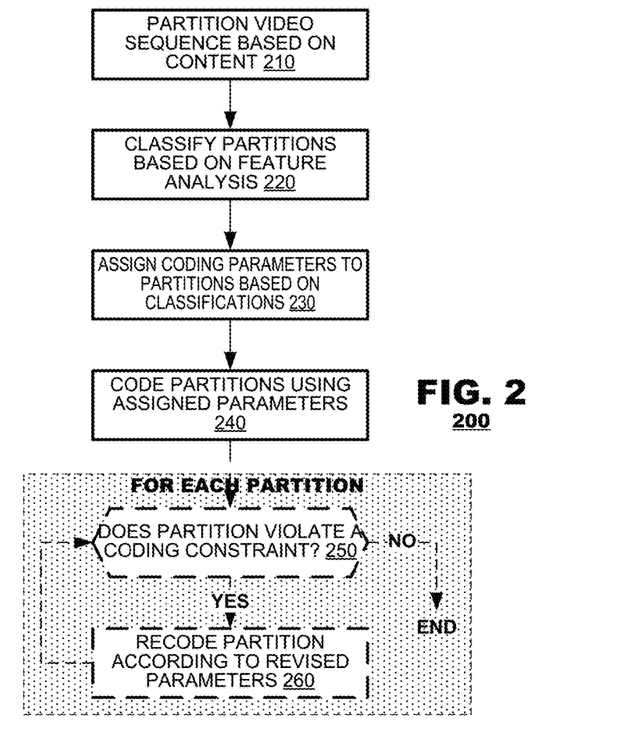
FIG. 2 illustrates a method according to an aspect of the present disclosure.

FIG. 2 illustrates a method 200 according to an aspect of the present disclosure. The method 200 may begin by partitioning a video sequence based on its content (box 210). Thereafter, the method 200 may classify partitions of the video sequence based on analysis of features within each partition, the comparisons of features from partitions and the analysis of correlation between the partitions (box 220). The method 200 may assign coding parameters to partitions based on their classifications (box 230). Thereafter, the method 200 may code the partitions based, respectively, on their assigned coding parameters (box 240).

Partitioning (box 210) may be performed in a variety of ways. In a first aspect, partitioning may be performed based on scene detection where each scene may be assigned to a respective partition. Thus, scene cuts may be detected based on frame-to-frame correlation algorithms, where frames that are identified as having low correlation to preceding frames are identified as "cuts."

In another aspect, partitioning may be performed based on object detection algorithms, where objects of predetermined types (such as human faces, human bodies, or other registered object types) are detected within frame content. Objects may be distinguished from each other. Thereafter, portions of the video sequence may be marked to indicate when the objects appear in image content and when they disappear from image content. For example, in a case of production programming, individual characters may appear and disappear from video content at various points in a program. Partitioning algorithms may identify points in a video sequence corresponding to appearances and disappearances of these characters from image data and partition the video sequence according to these points.

In another aspect, partitioning may be performed based on estimates of types of video content in video, for example, whether video content is natural or computer generated (e.g., graphics or CGI). Such types of video typically exhibit characteristic profiles based on noise, brightness, image structures and the like. A partitioning algorithm may perform analyses of a video and partition the video based on detection of image types.

And, of course, partitioning may be performed based on metadata provided with the source video. In some applications, producers of source video may provide metadata that distinguish portions of the sequence from other portions, for example, by scenes or other producer-defined structures. Video may be partitioned according to such metadata.

Partition classification (box 220) also may be performed in a variety of ways. Feature analysis may quantify content of the partitions respectively by characteristics of video contained in each respective partition. For example, feature analysis may assess one or more of the following metrics: spatial complexity of frames within the partitions (e.g., complexity of texture), temporal complexity (e.g., an amount of frame-to-frame motion), histograms of luma and chroma samples, noise level fading characteristics exhibited by each partition's video, relative sizes of foreground objects in video content, content changes, brightness, color range, presence (and perhaps number) of objects within motion, and/or background content. In practice, system designers likely will define a number of metrics on which to evaluate the various partitions and tailor the metrics, both the number and type, to suit their individual application needs.

Feature analysis may generate numerical scores that rate the partitions on each of the selected metrics. Thereafter, the partitions may be grouped together based on their feature analysis scores. Thus, different partitions that have relatively similar scores may be assigned to a common group whereas other partitions that have very different scores from each other may be assigned to different groups. It may be convenient to use clustering algorithms that determine relative distances of each partition's score from scores of other partitions, then to group partitions based on their distances. Here, system designers may define threshold distances that are sufficient to group partitions together or to distinguish them from each other. Moreover, distances may be weighted to give priority to certain feature analysis metrics (for example, presence of objects) over other metrics.

Coding parameters may be assigned to partitions (box 230) based on the classifications. In this manner, partitions that are assigned to a common group may be assigned a common set of coding parameters. When the partitions of a common group are coded (box 240), it is expected that the grouped partition will have generally consistent artifacts due to the presence of commonly-assigned coding parameters. This technique minimizes partition-to-partition differences in the type of artifacts that are incurred for partitions having similar content.

Figure 3A:
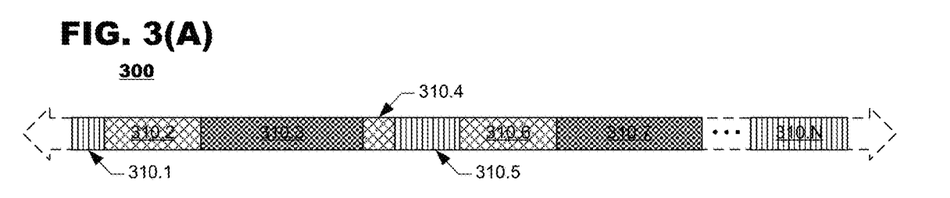
FIG. 3(A) illustrates a video sequence 300 that is partitioned into a plurality of partitions 310.1-310.N.

FIGS. 3(A)-3(D) illustrate application of the method 200 (FIG. 2) to a hypothetical video sequence, according to an aspect of the present disclosure. FIG. 3(A) schematically illustrates a video sequence 300 that is partitioned into a plurality of partitions 310.1-310.N. The segments 1-N are shown as collected into a plurality of groups 320.1-320.N based on feature analysis. In this example, partitions 310.1, 310.5 and 310.N are shown assigned to a first common group 320.1, partitions 310.2, 310.4, and 310.6 are shown assigned to a second common group 320.2, and partitions 310.3 and 310.7 are not assigned to groups with other partitions. Essentially, partition 310.3 is assigned to its own group 320.3 and partition 310.7 is assigned to another separate group 320.4.

Figure 3B:
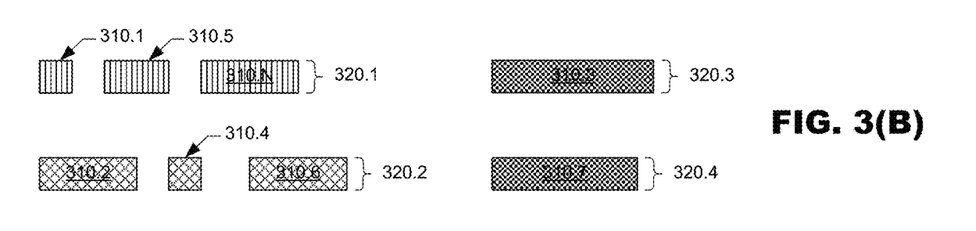
FIG. 3(B) illustrates groupings of the partitions.
Figure 3C:
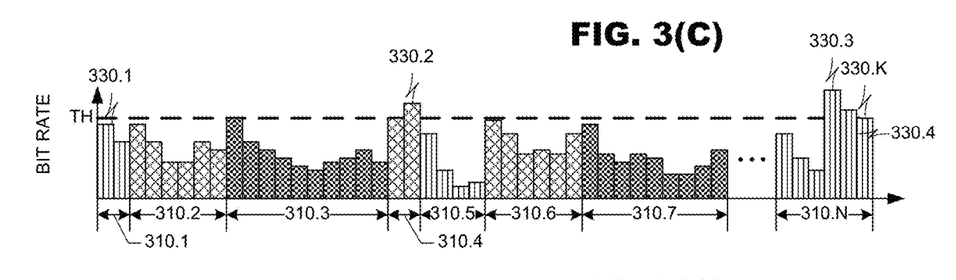
FIGS. 3(C) and 3(D) are graphs illustrating coded video data and bitrates obtained therefrom.
Figure 3D:
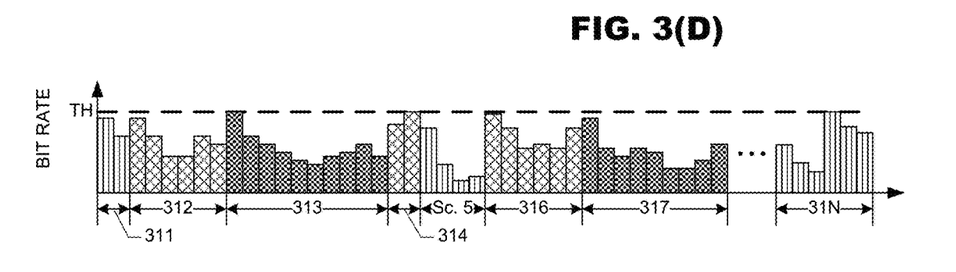

As discussed, partitions that are assigned to common groups may have a common set of coding parameters applied to them. Thus, the partitions 310.1, 310.5 and 310.N of group 320.1 may have a common set of coding parameters applied to them, which may be developed separately from the coding parameters assigned to the partitions 310.2-310.4 and 310.6-310.7 of the other groups 320.2-320.4. Similarly, the partitions 310.2, 310.4 and 310.6 of group 320.2 may have a common set of coding parameters applied to them, which may be developed separately from the coding parameters assigned to the partitions 310.1, 310.3, 310.5, and 310.7-310.N of the other groups 320.1 and 320.3-320.4. FIGS. 3(A)-3(C) illustrate the segments of the respective groups 320.1-320.4 each having common hatching to represent the common set of coding parameters for each group.

Assignment of coding parameters also may be performed in a variety of ways. In a first aspect, for example, frames may be assigned a common quantization parameter, a common quantization dead-zone parameter, a common in loop deblocking filter strength, and/or common sample adaptive offset (SAO) filter settings. Similarly, rate-distortion decisions whether or not to code prediction residuals may be applied in common to all frames within the partition. It is not required that every coding decision be applied identically to all frames. Instead, it is expected that system designer will select a set of coding parameters to be applied in common and the identified set of parameters will be applied in common. For example, it may be sufficient to select quantization parameters, deblocking and SAO filtering parameters out of a larger set of available coding parameters that are applied in common to the group. In practice, the number of parameters and the parameter values may be tuned for individual application needs.

In other aspect, coding parameters may be defined as common ranges of values to be applied during coding. For example, quantization parameters may be constrained to a predetermined range of numerical values, from which a coder 110 (FIG. 1) may select to apply to different elements of the partition. Many modern coding protocols permit quantization parameters to vary from frame to frame and within sub-frame elements such as slices, coding units and/or macroblocks. Coder that perform coding according to these protocols may adjust quantization parameters to meet coding bitrate and/or coding quality constraints. The techniques described herein may work cooperatively with such coders by defining a range of quantization parameters that may be applied during coding. If a coder ordinarily would select a quantization parameter that falls outside the range that is assigned to a given partition when operating according to its own coding policy directives, the quantization parameter may be clipped to a value at an end of the partition's range.

In another aspect, ranges of coding values may be defined for other parameter types such as deblocking filter strength, SAO type (band offset or edge offset), SAO band position, SAO band offset, SAO edge offset, quantization dead-zone parameters, etc.

In another aspect, assignment of coding parameters may be derived from an assessment of coding quality. In this aspect, a common coding quality metric may be defined for all partitions. A coder 110 (FIG. 1) may select coding parameters that cause the coded data, when decoded, to yield recovered video data that meets a common quality metric. In this regard, a coder 110 may have its own local decoder that generates recovered video from the coded video data generated by the coder 110. The coder 110 may compare recovered video to the source video from which it is generated to estimate data losses incurred by the coding/decoding process. For example, the coder 110 may perform a pixel-wise comparison of frames of the recovered video to corresponding frames from the source video and estimate errors between them. Errors may be aggregated on a statistical basis, such as by a sum of absolute differences, and compared to a threshold. Using this technique, a coder may select coding parameters for each frame in a given group that yield recovered video data at a quality level that meets a predetermined threshold value.

Having assigned coding parameters to each partition, the video of each partition may be coded (box 240). Typically, a coding protocol will generate coded video data using a protocol that is amenable to segmented transmission. For example, using the HTTP Live Streaming ("HLS") protocol, coded video data may be arranged into transmission units, called "segments," that are separately addressed for download by decoder devices. Similarly, using the MPEG-Dash protocol, coded video data may be arranged into transmission units, called "chunks," that are separately addressed for download by decoder devices. FIG. 3(C) illustrates a graph of a plurality of transmission units 330.1-330.K that may be generated by coding the various partitions and hypothetical bit rates for each.

Returning to FIG. 2, in an aspect, the method 200 may determine if other coding policies are being met by the coded partitions. For example, as illustrated, the method 200 may determine if a coded partition violates a predetermined coding constraint (box 250). If so, then the method 200 may recode video data of a partition that violates the coding constraint (box 260). Coded partitions that do not violate the constraint need not be processed further.

Peak bit rate is a common constraint in video coding applications. When operating according to a peak bit rate constraint, a coder must ensure that coded video data does exceed a predetermined bit rate. For example, the coder might ensure that each transmission unit 330.1-330.K has a bit size that falls under a predetermined sized limit. Alternatively, the coder might ensure that the data rate of the coded video data does not exceed a predetermined bit rate over any predetermined period of time.

FIG. 3(C) illustrates an exemplary peak bit rate constraint for transmission units. In this example, transmission units that carry coded video data each must have a size that is less than a threshold TH size. In the illustrated example, coded segments 330.2 from partition 310.4 and segments 330.3 and 330.4 from segment 310.N exceed the constraint TH. During operation of boxes 250-260 (FIG. 2), the segments from these partitions 310.4, 310.N may be recoded to reduce their bit rates to fit within the constraint TH. When doing so, the method 200 may alter the coding parameters of these partitions 310.4, 310.N using coding parameters that deviate from the parameters assigned to their respective groups 320.2 (for segment 310.4) and 320.1 (for segment 310.N). In this regard, operation of boxes 250-260 may operate as an exception to the parameter assignments that are made by default in box 230.

The examples shown in FIGS. 3(A)-3(D) illustrate a simple coding case where each transmission unit contains data from only a single partition. In practice, however, there is no requirement that partition boundaries coincide with boundaries of transmission units. And, in many cases, there will be transmission units that contain data from two or perhaps a greater number of partitions.

In an aspect, when a transmission unit contains coded video data from a plurality of partitions and the transmission unit exceeds a coding constraint such as the peak bit rate constraint, the method 200 may estimate which of the partitions contribute to the constraint violation. If a partition can be identified that causes a constraint violation, the method 200 revise coding of the identified partition, leaving the other partitions of the transmission unit unchanged.

In another aspect, coding constraints may be applied by confirming that coded video data meets a predetermined metric over a period of time. For example, rather than evaluate sizes of individual transmission units, a constraint may require that bit rates over a predetermined period of time meet a predetermined requirement (for example, coded video data cannot exceed 1 MB/s over a 2 second period). In this example, a coder may review coded video data as a sliding window over the coded bit stream, where the window has a size corresponding to the governing period (e.g., a 2 second window). The coder may determine whether coded video data violates the constraint over the period. If any sliding window is identified that violates the constraint, the coder may identify the partition(s) that contribute to the violation and recode it.

In yet another aspect, the sliding window approach may be limited to consider partitions on an individual basis. That is, a sliding window may be defined to begin at the onset of a partition, then terminate when the sliding window reaches an end of the respective partition.

In another aspect, the sliding window approach may be applied to the coded video sequence as a whole and may bridge partitions. Thus, it may occur that a constraint violation occurs when the sliding window contains contribution from two or more partitions. In this case, the method may estimate which partition contributes most to the constraint violation and recode that partition, leaving other partitions unchanged.

Figure 4:
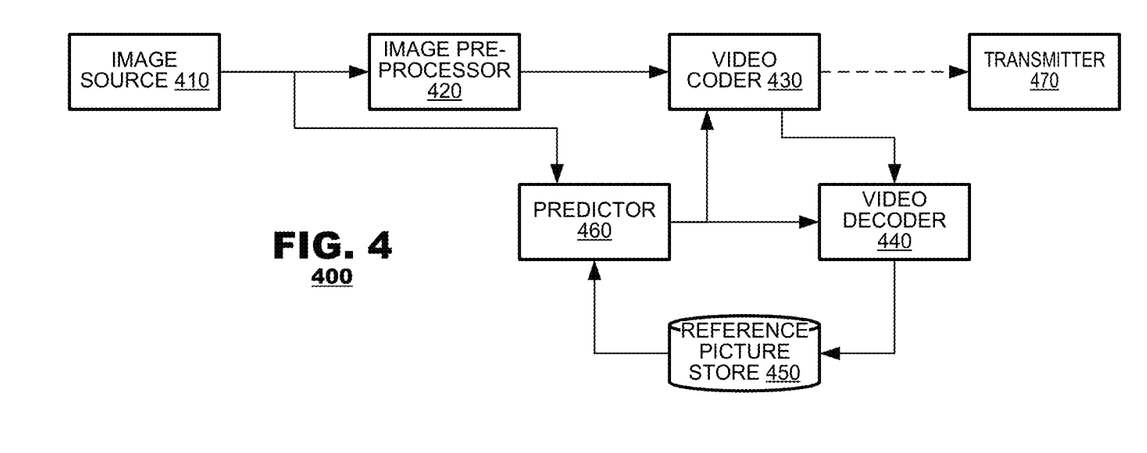
FIG. 4 is a functional block diagram of a coding device according to an aspect of the present disclosure.

FIG. 4 is a functional block diagram of a coding device 400 according to an aspect of the present disclosure. The coding device 400 may include an image source 410, a pre-processing system 420, a video coder 430, a video decoder 440, a reference picture store 450, a predictor 460, and a transmitter 470.

The image source 410 may provide video data to be coded. The pre-processing system 420 may process video data to condition it for coding by the video coder 430. For example, the pre-processing system 420 may parse individual frames into "pixel blocks," arrays of pixel data that will be coded in sequence by the video coder 430. The pre-processor may perform partitioning and feature analysis of the video (boxes 210-220 of FIG. 2). The pre-processor 420 also may perform other operations, such as filtering, to facilitate coding.

The video coder 430 may generate a coded representation of its input image data, typically by exploiting spatial and/or temporal redundancies in the image data. The video coder 430 may perform coding parameter assignment and coding of video (boxes 230-240 of FIG. 2) and, where necessary recoding of video (boxes 250-260). The video coder 430 may output a coded representation of the input data that consumes less bandwidth than the original source video when transmitted and/or stored.

The video decoder 440 may invert coding operations performed by the video encoder 430 to obtain recovered video from the coded video data. As discussed, the coding processes applied by the video coder 430 are lossy processes, which cause the recovered video to possess various errors when compared to the original picture. The video decoder 440 may reconstruct pictures of select coded pictures, which are designated as "reference pictures," and store the decoded reference pictures in the reference picture store 450. In the absence of transmission errors, the decoded reference pictures will replicate decoded reference pictures obtained by a decoder (not shown in FIG. 4).

The predictor 460 may select prediction references for new input pictures as they are coded. For each portion of the input picture being coded (called a "pixel block" for convenience), the predictor 460 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 460 may furnish the prediction data to the video coder 430. The video coder 430 may code input video data differentially with respect to prediction data furnished by the predictor 460. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 430 should consume less bandwidth than the input data when transmitted and/or stored. The image source device 400 may output the coded video data to an output device 470, such as a transmitter, that may transmit the coded video data across a communication network 130 (FIG. 1). Alternatively, the image source device 400 may output coded data to a storage device (not shown) such as an electronic-, magnetic- and/or optical storage medium.

Figure 5:
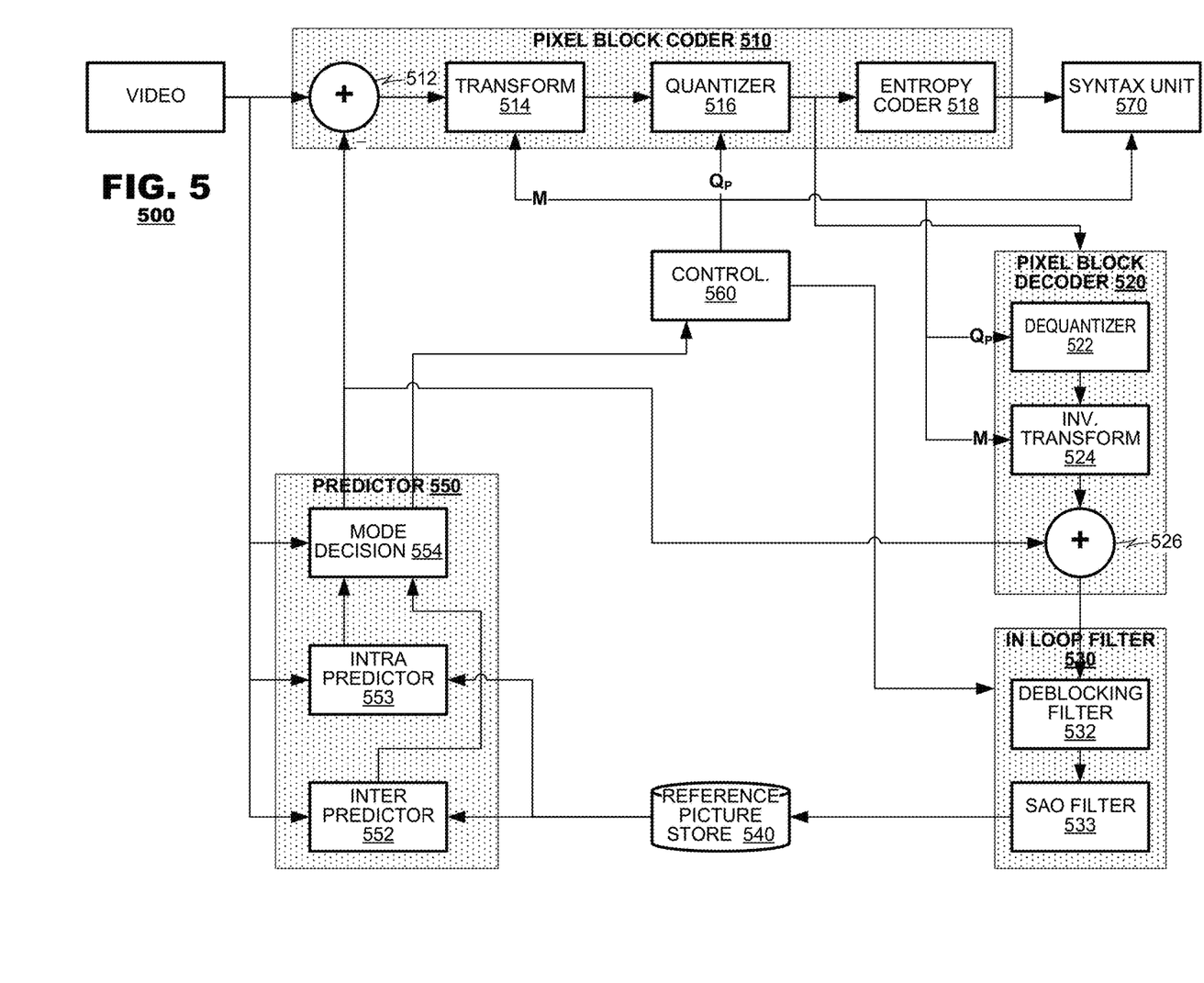
FIG. 5 is a functional block diagram of a coding system according to an aspect of the present disclosure.

FIG. 5 is a functional block diagram of a coding system 500 according to an aspect of the present disclosure. The system 500 may include a pixel block coder 510, a pixel block decoder 520, an in-loop filter system 530, a reference picture store 540, a predictor 550, a controller 560, and a syntax unit 570. The pixel block coder and decoder 510, 520 and the predictor 550 may operate iteratively on individual pixel blocks of a frame. The predictor 550 may predict data for use during coding of a newly-presented input pixel block. The pixel block coder 510 may code the new pixel block by predictive coding techniques and present coded pixel block data to the syntax unit 570. The pixel block decoder 520 may decode the coded pixel block data, generating decoded pixel block data therefrom. The in-loop filter 530 may perform various filtering operations on a decoded picture that is assembled from the decoded pixel blocks obtained by the pixel block decoder 520. The filtered picture may be stored in the reference picture store 540 where it may be used as a source of prediction of a later-received pixel block. The syntax unit 570 may assemble a data stream from the coded pixel block data, which conforms, to a governing coding protocol.

The pixel block coder 510 may include a subtractor 512, a transform unit 514, a quantizer 516, and an entropy coder 518. The pixel block coder 510 may accept pixel blocks of input data at the subtractor 512. The subtractor 512 may receive predicted pixel blocks from the predictor 550 and generate an array of pixel residuals therefrom representing a difference between the input pixel block and the predicted pixel block. The transform unit 514 may apply a transform to the sample data output from the subtractor 512, to convert data from the pixel domain to a domain of transform coefficients. The quantizer 516 may perform quantization of transform coefficients output by the transform unit 514. The quantizer 516 may be a uniform or a non-uniform quantizer. The entropy coder 518 may reduce bandwidth of the output of the coefficient quantizer by coding the output, for example, by variable length code words.

The transform unit 514 may operate in a variety of transform modes as determined by the controller 560. For example, the transform unit 514 may apply a discrete cosine transform (DCT), a discrete sine transform (DST), a Walsh-Hadamard transform, a Haar transform, a Daubechies wavelet transform, or the like. In an aspect, the controller 560 may select a coding mode M to be applied by the transform unit 515, may configure the transform unit 515 accordingly and may signal the coding mode M in the coded video data, either expressly or impliedly.

The quantizer 516 may operate according to a quantization parameter $Q_P$ that is supplied by the controller 560. In another aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 518, as its name implies, may perform entropy coding of data output from the quantizer 516. For example, the entropy coder 518 may perform run length coding, Huffman coding, Golomb coding and the like.

The pixel block decoder 520 may invert coding operations of the pixel block coder 510. For example, the pixel block decoder 520 may include a dequantizer 522, an inverse transform unit 524, and an adder 526. The pixel block decoder 520 may take its input data from an output of the quantizer 516. Although permissible, the pixel block decoder 520 need not perform entropy decoding of entropy-coded data since entropy coding is a lossless event. The dequantizer 522 may invert operations of the quantizer 516 of the pixel block coder 510. The dequantizer 522 may perform uniform or non-uniform de-quantization as specified by the decoded signal $Q_P$. Similarly, the inverse transform unit 524 may invert operations of the transform unit 514. The dequantizer 522 and the inverse transform unit 524 may use the same quantization parameters $Q_P$ and transform mode M as their counterparts in the pixel block coder 510. Quantization operations likely will truncate data in various respects and, therefore, data recovered by the dequantizer 522 likely will possess coding errors when compared to the data presented to the quantizer 516 in the pixel block coder 510.

The adder 526 may invert operations performed by the subtractor 512. It may receive the same prediction pixel block from the predictor 550 that the subtractor 512 used in generating residual signals. The adder 526 may add the prediction pixel block to reconstructed residual values output by the inverse transform unit 524 and may output reconstructed pixel block data.

The in-loop filter 530 may perform various filtering operations on recovered pixel block data. For example, the in-loop filter 530 may include a deblocking filter 532 and a sample adaptive offset ("SAO") filter 533. The deblocking filter 532 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 530 may operate according to parameters that are selected by the controller 560.

The reference picture store 540 may store filtered pixel data for use in later prediction of other pixel blocks. Different types of prediction data are made available to the predictor 550 for different prediction modes. For example, for an input pixel block, intra prediction takes a prediction reference from decoded data of the same picture in which the input pixel block is located. Thus, the reference picture store 540 may store decoded pixel block data of each picture as it is coded. For the same input pixel block, inter prediction may take a prediction reference from previously coded and decoded pictures that are designated as reference pictures. Thus, the reference picture store 540 may store these decoded reference pictures.

As discussed, the predictor 550 may supply prediction data to the pixel block coder 510 for use in generating residuals. The predictor 550 may include an inter predictor 552, an intra predictor 553 and a mode decision unit 552. The inter predictor 552 may receive pixel block data representing a new pixel block to be coded and may search reference picture data from store 540 for pixel block data from reference pictures for use in coding the input pixel block. The inter predictor 552 may support a plurality of prediction modes, such as P mode coding and B mode coding. The inter predictor 552 may select an inter prediction mode and an identification of candidate prediction reference data that provides a closest match to the input pixel block being coded. The inter predictor 552 may generate prediction reference metadata, such as motion vectors, to identify which portion(s) of which reference pictures were selected as source(s) of prediction for the input pixel block.

The intra predictor 553 may support Intra (I) mode coding. The intra predictor 553 may search from among pixel block data from the same picture as the pixel block being coded that provides a closest match to the input pixel block. The intra predictor 553 also may generate prediction reference indicators to identify which portion of the picture was selected as a source of prediction for the input pixel block.

The mode decision unit 552 may select a final coding mode to be applied to the input pixel block. Typically, as described above, the mode decision unit 552 selects the prediction mode that will achieve the lowest distortion when video is decoded given a target bitrate. Exceptions may arise when coding modes are selected to satisfy other policies to which the coding system 500 adheres, such as satisfying a particular channel behavior, or supporting random access or data refresh policies. When the mode decision selects the final coding mode, the mode decision unit 552 may output a selected reference block from the store 540 to the pixel block coder and decoder 510, 520 and may supply to the controller 560 an identification of the selected prediction mode along with the prediction reference indicators corresponding to the selected mode.

The controller 560 may control overall operation of the coding system 500. The controller 560 may select operational parameters for the pixel block coder 510 and the predictor 550 based on analyses of input pixel blocks and also external constraints, such as coding bitrate targets and other operational parameters. As is relevant to the present discussion, when the controller 560 selects quantization parameters $Q_P$, the use of uniform or non-uniform quantizers, and/or the transform mode M, it may provide those parameters to the syntax unit 570, which may include data representing those parameters in the data stream of coded video data output by the system 500. The controller 560 also may select between different modes of operation by which the system may generate reference images and may include metadata identifying the modes selected for each portion of coded data.

During operation, the controller 560 may revise operational parameters of the quantizer 516 and the transform unit 515 at different granularities of image data, either on a per pixel block basis or on a larger granularity (for example, per picture, per slice, per largest coding unit ("LCU") or another region). In an aspect, the quantization parameters may be revised on a per-pixel basis within a coded picture.

Additionally, as discussed, the controller 560 may control operation of the in-loop filter 530 and the prediction unit 550. Such control may include, for the prediction unit 550, mode selection (lambda, modes to be tested, search windows, distortion strategies, etc.), and, for the in-loop filter 530, selection of filter parameters, reordering parameters, weighted prediction, etc.

The selection of transform modes M, quantization parameters $Q_p$, filter parameters, and other coding parameters described above are the types of coding parameters that may be assigned to frames of partitions based on groups to which they are assigned. Thus, the controller 560 may control application of selected coding parameters as described in the foregoing discussion of FIGS. 2 and 3(A)-3(D).

Figure 6:
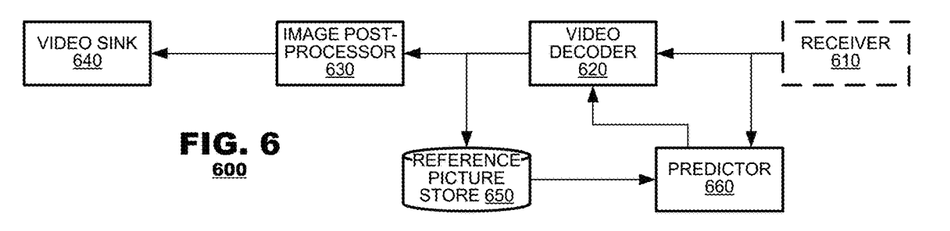
FIG. 6 is a functional block diagram of a decoder device according to an aspect of the present disclosure.

FIG. 6 is a functional block diagram of a decoder device 600 according to an aspect of the present disclosure. The decoding system 600 may include a receiver 610, a video decoder 620, an image processor 630, a video sink 640, a reference picture store 650 and a predictor 660. The receiver 610 may receive coded video data from a channel and route it to the video decoder 620. The video decoder 620 may decode the coded video data with reference to prediction data supplied by the predictor 660.

The predictor 660 may receive prediction metadata in the coded video data, retrieve content from the reference picture store 650 in response thereto, and provide the retrieved prediction content to the video decoder 620 for use in decoding.

The video sink 640, as indicated, may consume decoded video generated by the decoding system 600. Video sinks 640 may be embodied by, for example, display devices that render decoded video. In other applications, video sinks 640 may be embodied by computer applications, for example, gaming applications, virtual reality applications and/or video editing applications, that integrate the decoded video into their content.

Figure 7:
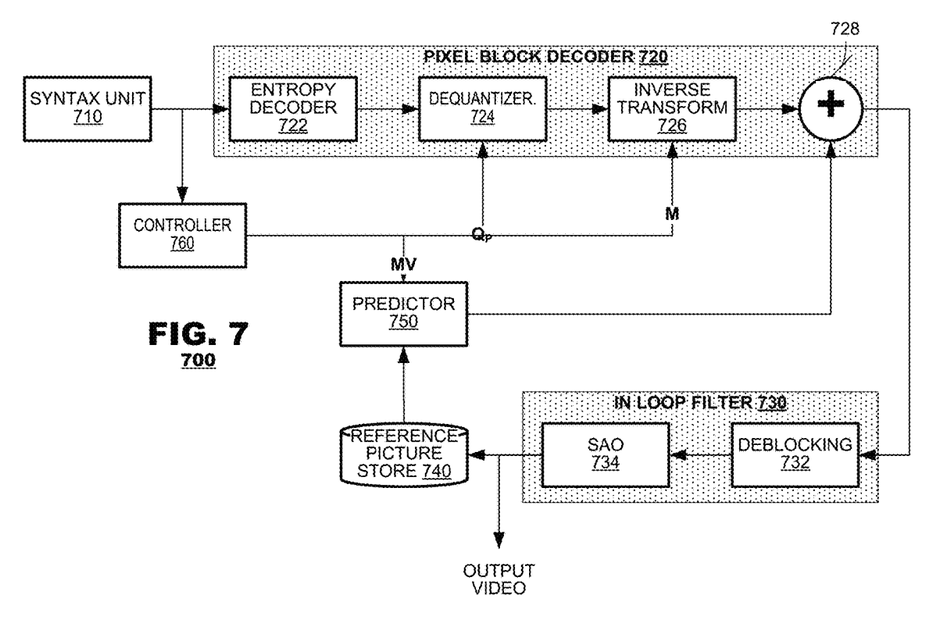
FIG. 7 is a functional block diagram of a decoding system according to an aspect of the present disclosure.

FIG. 7 is a functional block diagram of a decoding system 700 according to an aspect of the present disclosure. The decoding system 700 may include a syntax unit 710, a pixel block decoder 720, an in-loop filter 730, a reference picture store 740, a predictor 750, and a controller 760. The syntax unit 710 may receive a coded video data stream and may parse the coded data into its constituent parts. Data representing coding parameters may be furnished to the controller 760 while data representing coded residuals (the data output by the pixel block coder 510 of FIG. 5) may be furnished to the pixel block decoder 720. The pixel block decoder 720 may invert coding operations provided by the pixel block coder 510 (FIG. 5). The in-loop filter 730 may filter reconstructed pixel block data. The reconstructed pixel block data may be assembled into pictures for display and output from the decoding system 700 as output video. The pictures also may be stored in the prediction buffer 740 for use in prediction operations. The predictor 750 may supply prediction data to the pixel block decoder 720 as determined by coding data received in the coded video data stream.

The pixel block decoder 720 may include an entropy decoder 722, a dequantizer 724, an inverse transform unit 726, and an adder 728. The entropy decoder 722 may perform entropy decoding to invert processes performed by the entropy coder 518 (FIG. 5). The dequantizer 724 may invert operations of the quantizer 716 of the pixel block coder 510 (FIG. 5). Similarly, the inverse transform unit 726 may invert operations of the transform unit 514 (FIG. 5). They may use the quantization parameters $Q_P$ and transform modes M that are provided in the coded video data stream. Because quantization is likely to truncate data, the data recovered by the dequantizer 724, likely will possess coding errors when compared to the input data presented to its counterpart quantizer 716 in the pixel block coder 510 (FIG. 5).

The adder 728 may invert operations performed by the subtractor 512 (FIG. 5). It may receive a prediction pixel block from the predictor 750 as determined by prediction references in the coded video data stream. The adder 728 may add the prediction pixel block to reconstructed residual values output by the inverse transform unit 726 and may output reconstructed pixel block data.

The in-loop filter 730 may perform various filtering operations on reconstructed pixel block data. As illustrated, the in-loop filter 730 may include a deblocking filter 732 and an SAO filter 734. The deblocking filter 732 may filter data at seams between reconstructed pixel blocks to reduce discontinuities between the pixel blocks that arise due to coding. SAO filters 734 may add offset to pixel values according to an SAO type, for example, based on edge direction/shape and/or pixel level. Other types of in-loop filters may also be used in a similar manner. Operation of the deblocking filter 732 and the SAO filter 734 ideally would mimic operation of their counterparts in the coding system 500 (FIG. 5). Thus, in the absence of transmission errors or other abnormalities, the decoded picture obtained from the in-loop filter 730 of the decoding system 700 would be the same as the decoded picture obtained from the in-loop filter 530 of the coding system 500 (FIG. 5); in this manner, the coding system 500 and the decoding system 700 should store a common set of reference pictures in their respective reference picture stores 540, 740.

The reference picture store 740 may store filtered pixel data for use in later prediction of other pixel blocks. The reference picture store 740 may store decoded pixel block data of each picture as it is coded for use in intra prediction. The reference picture store 740 also may store decoded reference pictures.

As discussed, the predictor 750 may supply the transformed reference block data to the pixel block decoder 720. The predictor 750 may supply predicted pixel block data as determined by the prediction reference indicators supplied in the coded video data stream.

The controller 760 may control overall operation of the coding system 700. The controller 760 may set operational parameters for the pixel block decoder 720 and the predictor 750 based on parameters received in the coded video data stream. As is relevant to the present discussion, these operational parameters may include quantization parameters $Q_P$ for the dequantizer 724 and transform modes M for the inverse transform unit 710. As discussed, the received parameters may be set at various granularities of image data, for example, on a per pixel block basis, a per picture basis, a per slice basis, a per LCU basis, or based on other types of regions defined for the input image.

The foregoing discussion has described operation of the aspects of the present disclosure in the context of video coders and decoders. Commonly, these components are provided as electronic devices. Video encoder and decoder devices can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones, media players, and/or computer servers. Such computer programs typically are stored in physical storage media such as electronic-, magnetic- and/or optically-based storage devices, where they are read to a processor and executed. And, of course, these components may be provided as hybrid systems that distribute functionality across dedicated hardware components and programmed general-purpose processors, as desired.

Figure 8:
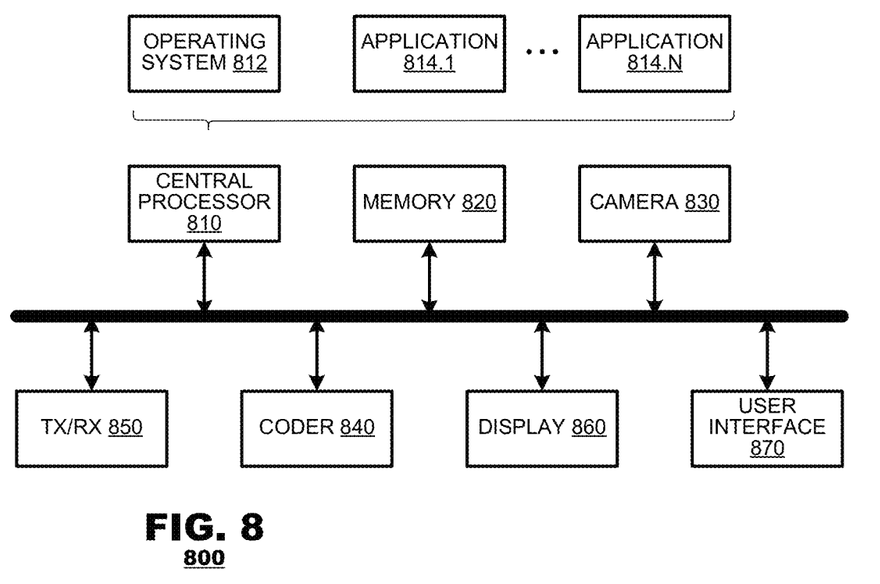
FIG. 8 illustrates an exemplary computer system 800 that may perform such techniques.

For example, the techniques described herein may be performed by a central processor of a computer system. FIG. 8 illustrates an exemplary computer system 800 that may perform such techniques. The computer system 800 may include a central processor 810 and a memory 820. The central processor 810 may read and execute various program instructions stored in the memory 820 that define an operating system 812 of the system 800 and various applications 814.1-814.N.

As indicated, the memory 820 may store program instructions that, when executed, cause the processor to perform the techniques described hereinabove. The memory 820 may store the program instructions on electrical-, magnetic- and/or optically-based storage media.

The system 800 may possess other components as may be consistent with the system's role as an image source device, an image sink device or both. Thus, in a role as an image source device, the system 800 may possess one or more cameras 830 that generate the video. Alternatively, it may execute an application 814.1 that generates video to be coded. The system 800 also may possess a coder 840 to perform video coding on the video and a transmitter 850 (shown as TX) to transmit data out from the system 800. The coder 850 may be provided as a hardware device (e.g., a processing circuit separate from the central processor 810) or it may be provided in software as an application 814.1.

In a role as an image sink device, the system 800 may possess a receiver 850 (shown as RX), a coder 840, a display 860 and user interface elements 870. The receiver 850 may receive data and the coder 840 may decode the data. The display 860 may be a display device on which content of the view window is rendered. The user interface 870 may include component devices (such as motion sensors, touch screen inputs, keyboard inputs, remote control inputs and/or controller inputs) through which operators input data to the system 800.

Further, a given device may operate in dual roles both as an encoder and a decoder. For example, when supporting a video conferencing application, a single device 800 may capture video data of a local environment, code it and transmit the coded video to another device while, at the same time, receiving coded video from the other device, decoding it and rendering it on a local display 860.

Several aspects of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A method, comprising:
   partitioning a video sequence into partitions, each partition is a scene comprising multiple frames;
   analyzing content of frames within each scene;
   determining, based on the content analysis, whether two or more scenes have similar content,
   when two or more scenes are determined to have similar content, grouping the scenes together;
   selecting a common set of coding parameters for the grouped-together scenes; and
   coding the video sequence according to coding parameters, wherein the coding comprises using the selected common set of coding parameters to code the grouped-together scenes.

2. The method of claim 1, wherein the partitioning the video sequence is based on scene change detection.

3. The method of claim 1, wherein the partitioning is performed based on object detection indicating that an object is detected in frames corresponding to at least one partition.

4. The method of claim 1, wherein the analyzing comprises detecting temporal complexity of frames in the partitions.

5. The method of claim 1, wherein the analyzing comprises detecting spatial complexity of frames in the partitions.

6. The method of claim 1, wherein the analyzing comprises identifying objects in frames of the partitions.

7. The method of claim 1, wherein the analyzing comprises deriving statistical measures of brightness of frames in the partitions.

8. The method of claim 1, wherein the analyzing comprises deriving statistical measures of color range of frames in the partitions.

9. The method of claim 1, wherein the coding parameters of the frames in the two commonly-grouped partitions are selected to have at least one coding parameter of identical value.

10. The method of claim 1, wherein the coding parameters of the frames in the two commonly-grouped partitions are selected from an identically-defined range of coding parameters defined for the partitions' group.

11. The method of claim 1, further comprising:
    comparing the coded video data of the partitions to a coding constraint, and
    when coded data of a partition violates the coding constraint, recoding the respective partition to meet the coding constraint.

12. The method of claim 11, wherein the constraint is a size of a transmission unit that contains coded video data.

13. The method of claim 11, wherein the constraint is an average bit rate of coded video data.

14. The method of claim 1, further comprising:
    comparing transmission units of coded video data to a coding constraint,
    when a transmission unit violates the coding constraint, identifying a partition that contributes to the constraint violation, and
    recoding the identified partition to meet the coding constraint.

15. A non-transitory computer readable medium storing program instructions that, when executed by a processing device, cause the device to:
    partition a video sequence into partitions, each partition is a scene comprising multiple frames;
    analyze content of frames within each scene, determine, based on the content analysis, whether two or more scenes have similar content, when two or more scenes are determined to have similar content, group the scenes together;

select a common set of coding parameters for the grouped-together scenes; and code the video sequence according to coding parameters, wherein the coding comprises using the selected common set of coding parameters to code the grouped-together scenes.

16. The medium of claim 15, wherein the partition the video sequence is based on scene change detection.

17. The medium of claim 15, wherein the partitioning is performed based on object detection indicating that an object is detected in frames corresponding to at least one partition.

18. The medium of claim 15, wherein the analyzing detects temporal complexity of frames in the partitions.

19. The medium of claim 15, wherein the analyzing detects spatial complexity of frames in the partitions.

20. The medium of claim 15, wherein the analyzing identifies objects in frames of the partitions.

21. The medium of claim 15, wherein the analyzing derives statistical measures of brightness of frames in the partitions.

22. The medium of claim 15, wherein the analyzing derives statistical measures of color range of frames in the partitions.

23. The medium of claim 15, wherein the coding parameters of the frames in the two commonly-grouped partitions have at least one coding parameter of identical value.

24. The medium of claim 15, wherein the coding parameters of the frames in the two commonly-grouped partitions are selected from an identically-defined range of coding parameters defined for the partitions' group.

25. A coding system, comprising:
a pre-processor to:
partition a video sequence into partitions, each partition is a scene comprising multiple frames,
analyze content of frames within each scene,
determine, based on the content analysis, whether two or more scenes have similar content,
when two or more scenes are determined to have similar content, group the scenes together, and
select a common set of coding parameters for the grouped-together scenes; and
a video coder to code the video sequence according to coding parameters, wherein the coding comprises using the selected common set of coding parameters to code the grouped-together scenes.

26. The system of claim 25, wherein the pre-processor detects temporal complexity of frames in the partitions.

27. The system of claim 25, wherein the pre-processor detects spatial complexity of frames in the partitions.

28. The system of claim 25, wherein the pre-processor identifies objects in frames of the partitions.

29. The system of claim 25, wherein the pre-processor derives statistical measures of brightness of frames in the partitions.

30. The system of claim 25, wherein the pre-processor derives statistical measures of color range of frames in the partitions.

31. The system of claim 25, wherein the coding parameters of the frames in the two commonly-grouped partitions have at least one coding parameter of identical value.

32. The system of claim 25, wherein the coding parameters of the frames in the two commonly-grouped partitions are selected from an identically-defined range of coding parameters defined for the partitions' group.

33. The method of claim 1, wherein the coding parameters of frames of commonly-grouped partitions are selected to yield recovered video data at a predetermined consistent quality value.

34. The method of claim 1, wherein the partitioning is based on types of video content, comprising computer generated content and real-world captured content.

35. The method of claim 1, wherein the partitioning is based on metadata provided with the video sequence.

* * * * *